United States Patent
Kou et al.

(10) Patent No.: US 6,907,301 B2
(45) Date of Patent: Jun. 14, 2005

(54) METHOD AND SYSTEM FOR SELECTING AND CONTROLLING DEVICES IN A HOME NETWORK

(75) Inventors: Sho Kou, Saratoga, CA (US); Hisato Shima, Tokyo (JP)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 533 days.

(21) Appl. No.: 09/976,588

(22) Filed: Oct. 12, 2001

(65) Prior Publication Data

US 2002/0078293 A1 Jun. 20, 2002

Related U.S. Application Data

(60) Provisional application No. 60/241,133, filed on Oct. 16, 2000.

(51) Int. Cl.[7] .................................................. G06F 9/00
(52) U.S. Cl. ...................... 700/19; 709/220; 709/223; 710/305; 725/100; 725/131
(58) Field of Search .......................... 700/19; 709/220, 709/223; 345/719, 735; 710/305; 370/451, 465; 725/100, 131, 133, 227, 228

(56) References Cited

U.S. PATENT DOCUMENTS

| | | | | |
|---|---|---|---|---|
| 5,883,621 A | * | 3/1999 | Iwamura | 725/37 |
| 6,243,707 B1 | * | 6/2001 | Humpleman et al. | 707/102 |
| 6,275,889 B1 | * | 8/2001 | Saito | 710/313 |
| 6,480,889 B1 | * | 11/2002 | Saito et al. | 709/220 |
| 6,546,419 B1 | * | 4/2003 | Humpleman et al. | 709/223 |
| 6,584,496 B1 | * | 6/2003 | Ludtke | 709/217 |
| 2003/0071842 A1 | * | 4/2003 | King et al. | 345/762 |

OTHER PUBLICATIONS

"AV/C Digital Interface Command Set General Specification", Audio Working Group, 1394 Trade Association, The Multimedia Connection, version 3.0, 3925 W. Braker Lane, Austin TX 78759.

"TA Document 1999039 AV/C Panel Subunit Specification 1.0", 1394 Trade Association Board of Directors, Jul. 10, 2000, Regency Plaza Suite 350, 2350 Mission College Blvd., Santa Clara, CA 95054.

"TA Document 1999031 AV/C Conection and Compatibility Management Specification 1.0", 1394 Trade Association Board of Directors, Jul. 10, 2000, Regency Plaza Suite 350, 2350 Mission College Blvd., Santa Clara, CA 95054.

* cited by examiner

Primary Examiner—Emanuel Todd Voeltz
(74) Attorney, Agent, or Firm—Wagner, Murabito & Hao LLP

(57) ABSTRACT

A method and system for selecting and controlling target devices on a digital home network, in particular a network compliant with IEEE 1394. Various aspects of the process for connecting target devices are moved from the controller to the target devices. An input-select button is used to select a device (a source device) to provide an input signal to another device (a sink device) on the home network. An output-select button is used to specify which output plug is to be used by the source device.

24 Claims, 6 Drawing Sheets

METHOD AND SYSTEM FOR SELECTING AND CONTROLLING DEVICES IN A HOME NETWORK

RELATED U.S. APPLICATION

This application claims priority to the co-pending provisional patent application, Ser. No. 60/241,133, entitled "Method and System for Selecting and Controlling Devices in a Home Network," with filing date Oct. 16, 2000, and assigned to the assignee of the present application.

TECHNICAL FIELD

The present invention relates to the field of digital electronic devices. In particular, the present invention pertains to devices interconnected in a digital home network.

BACKGROUND ART

The typical home entertainment system consists of a variety of different consumer electronic devices which present and record audio/visual (AV) media in different ways. For instance, typical AV equipment found in a home includes a number of components such as a radio receiver/tuner, a compact disk (CD) player and/or a digital video disc player (DVD), a number of speakers, a television (TV), a video cassette recorder (VCR), a tape deck, and the like. In an analog system, each of these components are connected to each other via a set of wires. This conventional AV system paradigm has become quite popular and can be found in many homes.

In an analog system, one component is usually the controlling component of the AV system; for example, the tuner. The controlling component has a number of specific inputs for coupling with the other components. The controlling component also has a corresponding number of control buttons or control switches which provide a limited degree of controllability and interoperability for the components. A user controls the AV system by manipulating the buttons and switches on the front of the controlling component or, alternatively, by manipulating buttons on a hand-held remote control unit.

As consumer electronic devices become more capable and complex, the conventional (analog) AV system paradigm is being replaced with a digital AV network architecture for networking consumer electronic devices. The digital AV network architecture provides a powerful platform on which device functionality and interoperability can be built, and is capable of taking advantage of the increased sophistication and intelligence that is being incorporated into consumer electronic devices. Consequently, digital home networks are also becoming quite popular.

A communication standard, the IEEE 1394 standard, has been proposed and is being implemented to connect digital devices in a network using a serial bus and a standard communication protocol layer (e.g., the audio visual control [AV/C] protocol). The IEEE 1394 standard is an international standard for implementing an inexpensive high-speed serial bus architecture which supports both asynchronous and isochronous format data transfers. The IEEE 1394 standard provides a high-speed serial bus for interconnecting digital devices, thereby providing universal input/output connection. The IEEE 1394 standard defines a digital interface for applications, thereby eliminating the need for an application to convert digital data to an analog form before it is transmitted across the bus. Correspondingly, a receiving application will receive digital data, not analog data, from the bus and will therefore not be required to convert analog data to digital form. The IEEE 1394 standard is ideal for consumer electronics communication in part because devices can be added to or removed from the serial bus while the bus is active.

In a digital home network, the underlying structure of the AV network consists of a set of interconnected consumer electronic devices ("target devices") providing services to a single user or to multiple simultaneous users. A central component (e.g., a "controller") can provide users with overall control and coordination of the network, although typically there is more than one controller/user interface for receiving user input and providing commands to the devices on the network.

The controller can be, for example, an intelligent device such as set-top box or a personal computer system. The controller can also be any one of the target devices with enough built-in intelligence for controlling the other devices in response to user input. Thus, for example, a TV can be used to control a VCR, or a set-top box can be used to control both the TV and the VCR. Similar to the analog system, a user controls the target devices by manipulating buttons and switches on the controller device or, alternatively, by manipulating buttons on a hand-held remote.

While there is some similarity in the way that analog and digital home networks are controlled, there are also several significant differences. Foremost, of course, is that the former uses analog signals for control, usually delivered via an infrared signal, while the latter uses digital signals that can be delivered using other means such as an IEEE 1394 cable. In addition, the commands and controls that can be asserted in an analog system are relatively limited in comparison to a digital system. For example, in the digital network, the controller can provide an on-screen display (e.g., a menu) of the various target devices connected to the network. The user can choose to connect with the various target devices by scrolling through the menu and making a selection. The user can also control the subunits that make up a target device. In general, the controller in a digital network provides the user with more options and a greater degree of control over the various devices in the network.

While a digital home network offers a number of advantages, there are also disadvantages associated with digital home networks. One disadvantage is associated with the complexity of the process used by the controller to connect with the various target devices. The target devices are versatile and typically multi-functional, and thus they may support many different types of connections within the home network. For example, AV/C devices (e.g., AV/C units) compliant with IEEE 1394 may have up to 31 external input plugs, 31 external output plugs, 31 serial bus input plugs, 31 serial bus output plugs, 31 subunit source plugs, 31 subunit destination plugs, 31 asynchronous input plugs, and 31 asynchronous output plugs. Moreover, there can be up to 32 different types of AV/C subunits in each AV/C unit, and five instances of each type, further increasing the number of possible connections. Thus, the controller must be configured to handle a large number of different connections.

In addition, the AV/C connection process itself can also be cumbersome and complex. Prior Art FIG. 1 shows the typical steps in a process 10 for connecting a target device to an IEEE 1394 home network and for establishing an active communication path between the target device and other devices on the network. (Note that the target device can be physically connected to the serial bus, but not connected with—in active communication with—the network or devices on the network.)

In step 1, the controller finds a particular target device; that is, it finds the target device's node identifier (node ID). In step 2, the controller finds information on the target device regarding the number of plugs, the types of plugs, and other like information needed for the connection. In step 3, the controller processes this information and connects the target device to the home network. In step 4, the controller allocates bandwidth on the serial bus to the target device, if bandwidth is available. If bandwidth is available, the controller allocates a channel to the target device; otherwise, a channel cannot be allocated.

In step 5, the controller sets the output Plug Control Register (oPCR), and in step 6, the controller sets the input Plug Control Register (iPCR). In step 7, the controller can then provide commands to the target device, such as "play" or "record," depending on the intended role of the target device in the home network.

The connection process illustrated by Prior Art FIG. 1 can be problematic for a number of reasons. For one, the workload required by the controller is quite extensive. In the prior art, the controller is required to retrieve the connection information, analyze it, and store it in memory. Considering just the number of plugs that can be available on a target device (as described above), the amount of information that needs to be received and processed by the processor can be extensive. This problem is multiplied by the number of target devices present on the home network.

Consequently, the controller device is equipped with substantial processing and memory resources, which can drive up the cost of such a device. As mentioned above, in an IEEE 1394 network, any device that has sufficient resources can serve as a controller device. However, because of the processing and memory resources required, and in particular because of the expense, it is more likely that the typical consumer will have a single controller device. Consequently, the user cannot be as flexible as he or she might want to be when controlling the home network; that is, the user will likely have to control the network from a central location using a personal computer.

In addition, the amount of information that is delivered from the target device to the controller can consume some portion of the available bandwidth of the serial bus. There is a maximum rate at which the serial bus can carry data and information. When the connection information is being sent from each of the target devices to the controller, the amount of bandwidth available to other target devices is reduced. Conversely, it is also possible that there may not be sufficient bandwidth available to complete the connection process, or to complete the connection process in a timely manner.

Furthermore, it may happen that the controller receives and processes the connection information (as in steps 2 and 3 of process 10), but then cannot allocate sufficient bandwidth to the target device (as in step 4 of process 10). Thus, the controller will need to repeat the connection process until finally it is successful, further consuming the resources of both the network and the controller while also inconveniencing and frustrating the user who is attempting to make a connection to the target device.

Another problem associated with prior art home networks is that the output from target devices (such as VCRs) is generally sent to all output plugs. That is, owing to the complexity of the AV/C protocol, it is difficult to specify a particular output plug for the output to use, so instead the output signal is sent to all plugs, digital and analog (e.g., to the video out plug, the S-video output plug, the serial bus output plugs, and the RCA jack). Consequently, the digital output is still sent out over the serial bus even if another device on the home network is not an intended recipient of the output. Thus, the available bandwidth is needlessly consumed, reducing the bandwidth available for other devices and channels.

In summary, as described in conjunction with Prior Art FIG. 1, the responsibility for establishing a connections lies completely with the controller, leading to the problems and disadvantages described above.

SUMMARY OF THE INVENTION

Therefore, what is needed is a system and/or method that can be used to select and control devices in a digital home network system such as an IEEE 1394 network. In addition, what is needed is a system and/or method that can satisfy the above need and that allows a user to select a device (e.g., a source device) to provide an input signal to another device (e.g., a sink device), and that also allows a user to specify what output plug is to be used by the source device. What is also needed is a system and/or method that can satisfy the above needs and that can reduce the processing and memory resources needed for the controller device in a digital home network, and that can also reduce the load placed on the available network bandwidth. In addition, what is needed is a system and/or method that can satisfy the above needs and that is user-friendly.

The present invention provides a method and system for selecting and controlling devices on a digital home network, in particular a network compliant with IEEE 1394. The embodiments of the present invention described herein are focused on moving particular aspects of the process for connecting target devices from the controller to the target devices. In one embodiment, instead of retrieving connection information describing, for example, the number and types of plugs, then processing and storing this information, the controller device requests that the target device connect with the next possible connection, and then interrogates certain state variables that identify the types of plugs available. A user, via the controller, can then select source and sink devices based on the information read from the target devices by the controller.

Thus, the present invention reduces the amount of information that needs to be provided by the target devices to the controller. Accordingly, the processing and memory resources required by the controller can be reduced, reducing the complexity of the controller and increasing its user-friendliness. Furthermore, the load placed on the available bandwidth of the serial bus can be reduced. These and other objects and advantages of the present invention will no doubt become obvious to those of ordinary skill in the art after having read the following detailed description of the preferred embodiments which are illustrated in the various drawing figures.

In one embodiment, an input-select button is used to select a device (a source device) to provide an input signal to another device (a sink device) on the home network. In another embodiment, an output-select button is used to specify which output plug is to be used by the source device.

Using the output-select button on the controller, the controller selects an output plug for a source device (e.g., an IEEE 1394 AV/C unit) based on, for example, the signal format, channel bandwidth, and channel number information provided by the source device in response to a query from the controller. In accordance with the present invention, the information pertaining to which plugs can be used and the resources required is provided by the controller device interrogating the state variables for the source device.

With the output selected, the controller can then select another AV/C unit, for example, using the input-select button to select a connection. Given the information of signal format and channel bandwidth provided in response to the controller's query, the target device can either provide a valid connection, or reject the connection for some reason. In the former case, the connection is quickly and readily established; in the latter case, the controller quickly and readily determines that the connection is not possible. More target devices can be added as desired using the input-select button.

In summary, in accordance with the present invention, the amount of processing and memory required by the controller is reduced by extending aspects of the connection process from the controller to the target (source and sink) devices.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

BEST MODE FOR CARRYING OUT THE INVENTION

Figure 1:
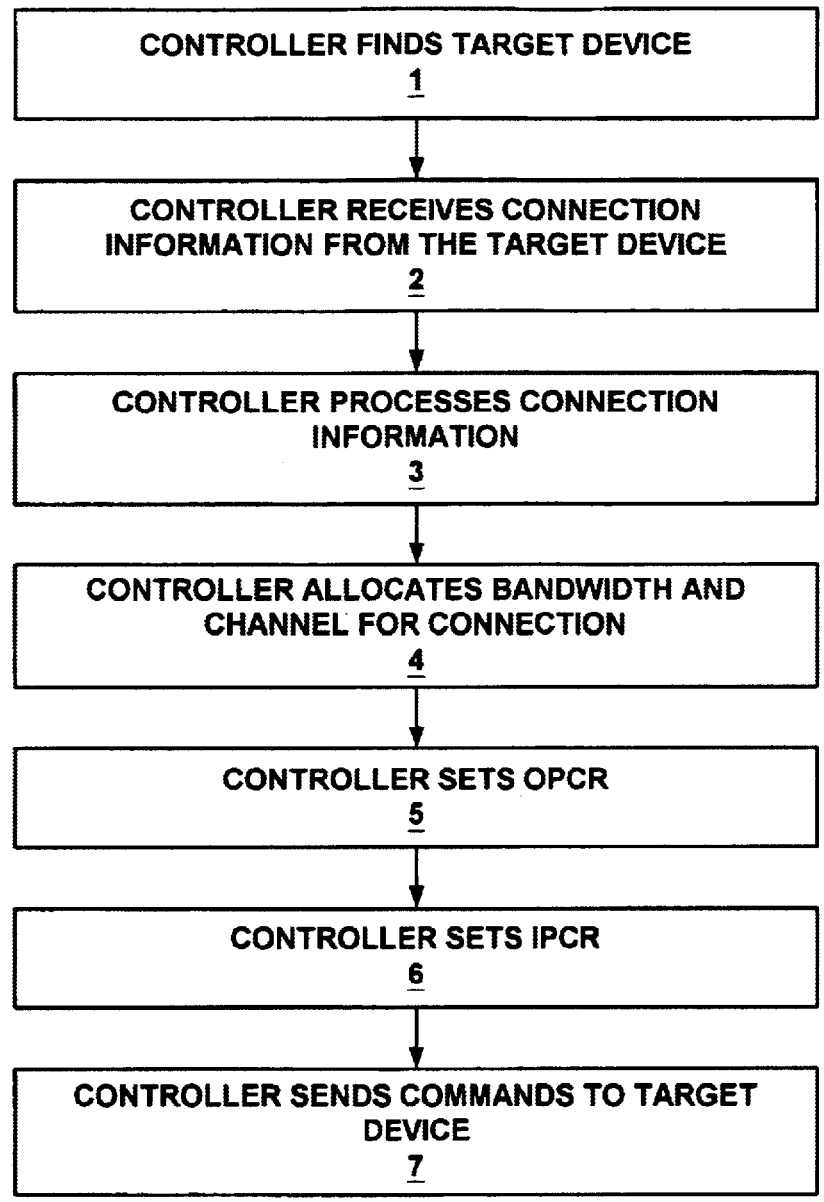
FIG. 1 is a flowchart of the steps in a process for connecting with and controlling target devices.

Reference will now be made in detail to the preferred embodiments of the invention, examples of which are illustrated in the accompanying drawings. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer system memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "selecting," "causing," "sending," "receiving," "connecting," "providing," "generating," "querying," "reading," "executing," "recording" or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems, such as, for example, optical and mechanical computers.

Current and proposed technologies allow consumer electronic devices to be connected in a home or office network and to transfer audio information, video information and other data to each other over a network bus. For the discussion herein, terms such as "consumer electronic device" and "network" are not limited to any form or type of device nor to any type of distribution network or data format. For the discussion herein, the present invention is discussed in the context of a home network comprising familiar consumer electronic devices interconnected by hardware using a serial bus and communicating via a standard protocol.

Figure 2:
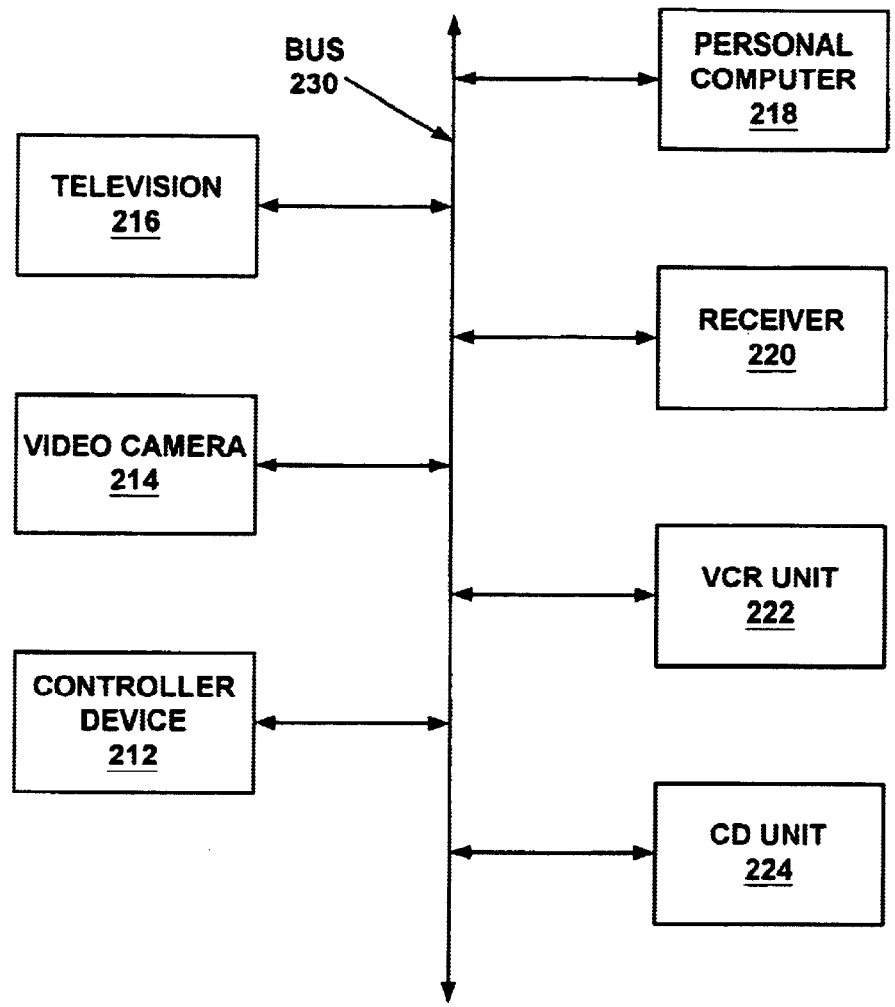
FIG. 2 illustrates a logical bus topology of a home network in accordance with one embodiment of the present invention.

FIG. 2 illustrates an exemplary network 210 that can support embodiments of the present invention. Network 210 comprises consumer electronic devices including personal computer systems, and can be extended to incorporate other electronic devices in different combinations than those illustrated.

Network 210 includes an integrated receiver/decoder device such as intelligent controller device 212, video camera 214, television 216, personal computer 218, receiver 220, video cassette recorder (VCR) unit 222, and compact disk (CD) unit 224 that are coupled together in network 210 by a network interface (e.g., bus 230). The consumer electronic devices are each considered a logical entity represented as a node on network 210, with a unique address, a set of control registers, and volatile and non-volatile memory units (refer to FIG. 3, below). The consumer electronic devices in network 210 are capable of interacting with each other on a peer-to-peer basis, and data, commands and the like can be sent between the devices within network 210.

In the present embodiment, bus 230 is a bus compliant with IEEE 1394. Accordingly, the consumer electronic devices of network 210 communicate over bus 230 using a protocol compliant with IEEE 1394 such as AV/C (audio visual control) protocol. Other embodiments of the present invention are operable within a network of consumer electronic devices compliant with the home audio/visual interoperability (HAVi) architecture that is known in the art. However, it is understood that other protocols, buses, network interfaces and network architectures may be utilized in accordance with the present invention.

The IEEE 1394 serial communication bus carries both commands and status information as well as digital audio and digital video signals between devices. One significant attribute of the IEEE 1394 technology is isochronous data flow. Connections may be point-to-point or utilize just sources or just sinks (also referred to as "broadcast-out" and "broadcast-in" connections). Sources are units or subunits that provide information and data to sinks.

Continuing with reference to FIG. 2, controller device 212 is an intelligent controller device. Controller device 212 is a system component/software element in network 210 that controls a target device (e.g., the other consumer electronic devices of network 210). Although controller device 212 is shown as a separate device in network 210, it is understood that network control can be provided by any of the devices in the network having sufficient resources (e.g., processing and memory resources). It is also appreciated that controller device 212 may be coupled to network 210 via a wireless connection (e.g., an infrared or radio frequency connection); refer to FIG. 4A, below.

Controller device 212 communicates with a user through a graphical user interface via some type of input/output device. The user's input/output device can be a number of well known devices including, for example, a remote control, a keyboard, a mouse or other cursor directing device, or a joystick, or a combination of these. In one embodiment, the input/output device is a handheld remote device comprising a plurality of buttons that are manipulated by the user in order to control the devices on the network.

Controller device 212 of FIG. 2 is typically coupled to a display device that enables the user to view menus or messages, and that also displays the user's input as the user enters it via the input/output device. The display device may be incorporated into controller device 212 or it may be separate from controller device 212; for example, television 216 could be used in conjunction with controller device 212 to display menus and messages to the user.

The consumer electronic devices in network 210 other than controller device 212 are referred to as target devices. The target devices in network 210 store their content (information and data) and/or broadcast services using some method or model providing a hierarchical set of data structures.

Figure 3:
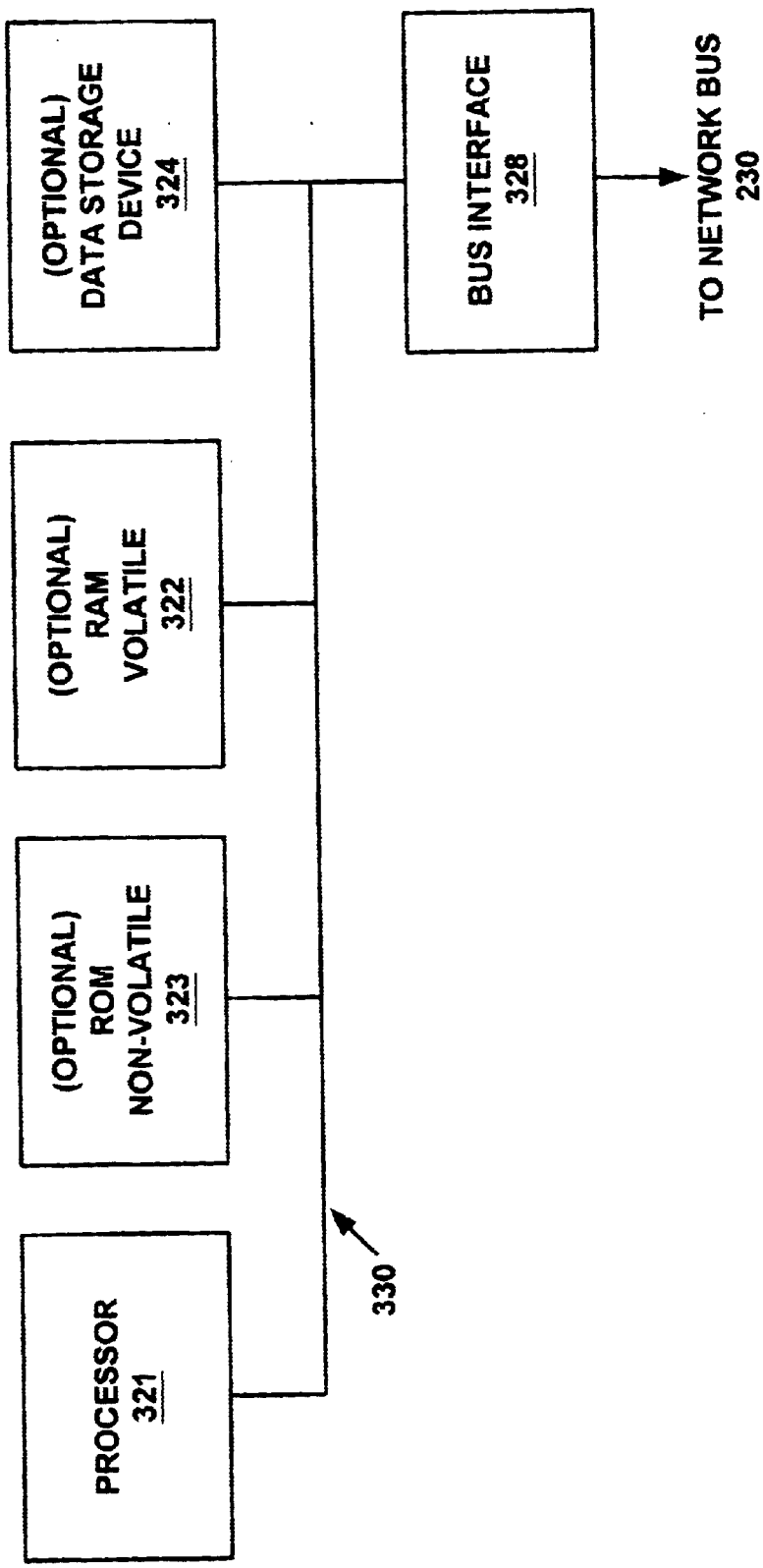
FIG. 3 is a block diagram of a target device used in accordance with one embodiment of the present invention.

FIG. 3 is a block diagram of one embodiment of target device 300 upon which embodiments of the present invention can be implemented. Although a variety of different target devices can be used in accordance with the present invention (as shown by FIG. 2), an exemplary device is represented by target device 300.

In general, target device 300 comprises bus 330 for communicating information, processor 321 coupled with bus 330 for processing information and instructions, optional random access memory (RAM volatile) 322 coupled with bus 330 for storing information and instructions for processor 321, optional read-only memory (ROM non-volatile) 323 coupled with bus 330 for storing static information and instructions for processor 321, and optional data storage device 324 such as a magnetic or optical disk and disk drive coupled with bus 330 for data such as media data, objects, content and broadcast services, and bus interface 328 for interfacing with network bus 230.

AV/C devices (e.g., AV/C units) such as target device 300 that are compliant with IEEE 1394 may have up to 31 external input plugs, 31 external output plugs, 31 serial bus input plugs, 31 serial bus output plugs, 31 subunit source plugs, 31 subunit destination plugs, 31 asynchronous input plugs, and 31 asynchronous output plugs. Moreover, there can be up to 32 different types of AV/C subunits in each AV/C unit. Each type can have up to five instances.

Target device 300 has knowledge of its plugs (e.g., number and type) and of connections that are possible, as well as connections that are not possible. In accordance with the present embodiment of the present invention, this knowledge is stored in memory (e.g., ROM non-volatile 323) as state variables that can be read by other devices, in particular a controller device such as controller device 212 of FIG. 2.

With reference to FIG. 3, in accordance with the present invention, the plug and connection information for each target device (e.g., target device 300) is not sent to the controller device (e.g., controller device 212 of FIG. 2) for processing and storage. Instead, this information is retained on target device 300 as state variables, and the state variables are interrogated by controller device 212. Accordingly, the AV/C connection process can be simplified, and a user can readily select a source device for input and an output plug to be used by the source device; refer to FIGS. 4A and 5, below. In addition, the controller device 212 can be simplified because it requires less processing and memory resources. Furthermore, available bandwidth is not consumed by the transfer of connection information from target device 300 to controller device 212. Also, when a target device 300 is selected by the user, the user knows that the connection will be made, and that it will not be necessary to repeatedly try to make a connection.

Figure 4A:
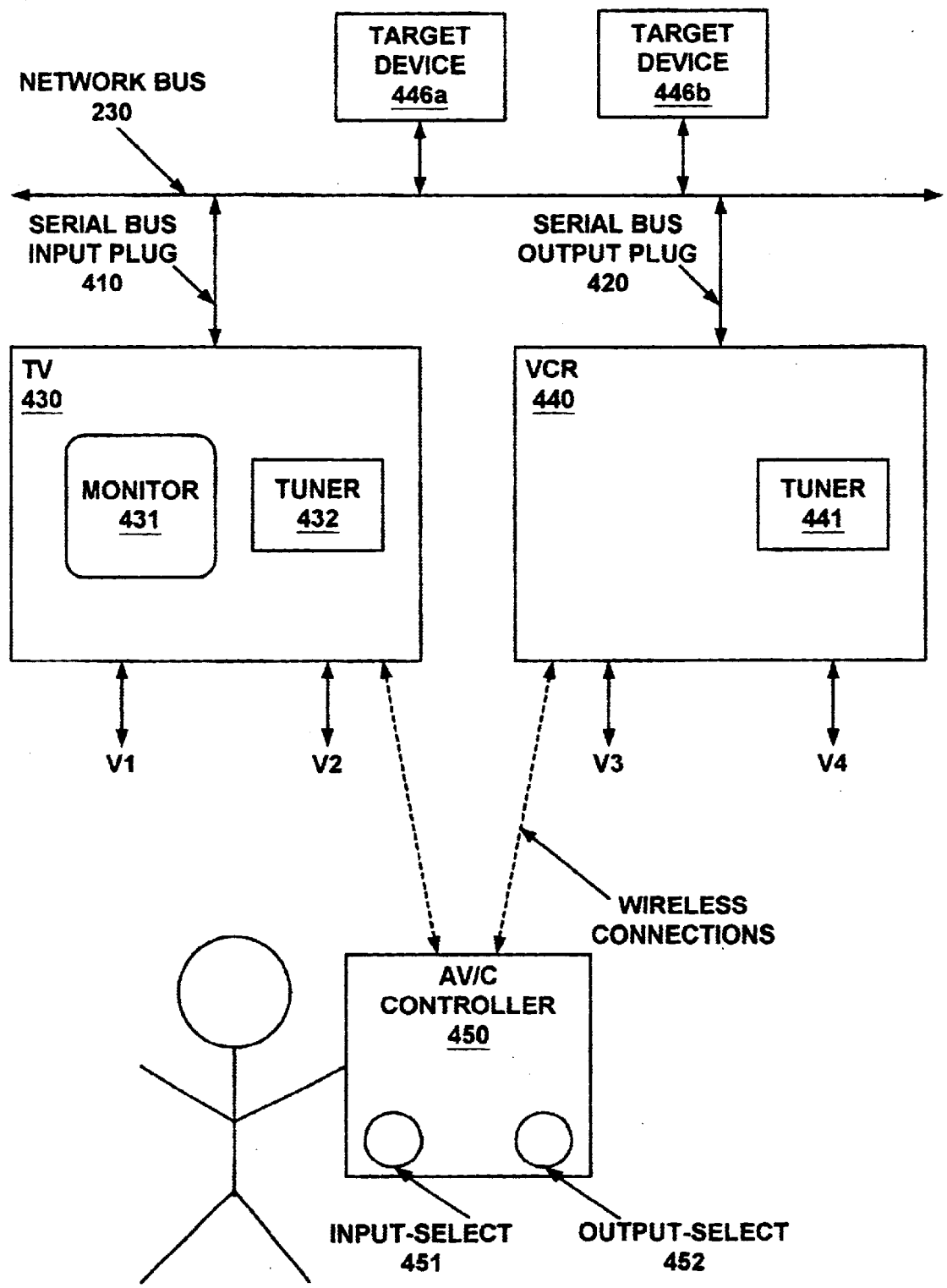
FIG. 4A is a block diagram showing devices in a home network in accordance with one embodiment of the present invention.

FIG. 4A illustrates a number of target devices (e.g., TV 430 and VCR 440) connected over network bus 230 in accordance with one embodiment of the present invention. In the present embodiment, TV 430 and VCR 440 are compliant with IEEE 1394 and incorporate the features of target device 300 of FIG. 3. TV 430 comprises a monitor 431 and a tuner 432, and may also include other components (e.g., subunits) not shown. VCR 440 comprises a tuner 441, and may also include other subunits not shown. Also coupled to network bus 230 are a plurality of other target devices compliant with IEEE 1394, exemplified by 446a and 446b.

With reference to FIG. 4A, TV 430 can have a multiplicity of input and output plugs; for simplicity of illustration and discussion, only a serial bus input plug 410 (digital) and video inputs/outputs V1 and V2 (analog) are shown. Similarly, VCR 440 can have a multiplicity of input and output plugs, although only serial bus output plug 420 (digital) and video inputs/outputs V3 and V4 (analog) are shown for simplicity of illustration and discussion.

In one embodiment, AV/C controller 450 communicates commands and other information to TV 430 and VCR 440 (as well as other devices) via a wireless connection (e.g., infrared or radio frequency signals); however, it is appreciated that AV/C controller 450 can also communicate with TV 430 and VCR 440 (as well as other devices) via an IEEE 1394 cable (e.g., network bus 230). In one embodiment, monitor 431 is used to display menus or messages to the user, and to also display the user's selections as they are made by the user. In another embodiment, a display device (not shown) may be incorporated into AV/C controller 450.

In one embodiment, in accordance with the present invention, AV/C controller 450 has an input-select button 451. In another embodiment, in accordance with the present invention, AV/C controller 450 also has an output-select button 452.

In accordance with the present invention, AV/C controller 450 is used to select a source device to provide input to a sink device such as TV 430. Specifically, input-select button 451 is used to make the input selection. AV/C controller 450 is also used to select which output plug will be used by a source device such as VCR 440. Specifically, output-select button 452 is used to make the output selection.

In the present embodiment, using a round-robin approach, a user uses AV/C controller 450 (specifically, input-select button 451) to scroll through a listing (e.g., a menu) of target devices (e.g., TV 430, VCR 440 and target devices 446a and 446b). Using input-select button 451, the user can select TV 430 and then can scroll through another listing (menu) that lists the input plugs on TV 430 (e.g., V1, V2 and serial bus input plug 410). From this latter menu, the user uses input-select button 451 to select a network connection (e.g., serial bus input plug 410).

The user can then use AV/C controller 450 (specifically, output-select button 452) to scroll through a listing (menu) of target devices that can be connected to TV 430 (e.g., VCR 440 and target devices 446a and 446b). The user then selects one of the devices, such as VCR 440, using output-select button 452. The user is provided with another listing (menu) that lists the output plugs on VCR 440 (e.g., V3, V4 and serial bus output plug 420). Using the output-select button 452, the user can select a network connection (e.g., serial bus output plug 420). In response to the user's input, VCR 440 is connected to TV 430 over network bus 230. That is, responsive to manipulation of output-select button 452, a channel is assigned between TV 430 and VCR 440 and bandwidth is allocated in accordance with the AV/C protocol. It is appreciated that a user can first use output-select button 452, then input-select button 451, to have a channel assigned and bandwidth allocated as described above.

In accordance with the present invention, information such as the input and output plug information is not processed and stored on AV/C controller 450. Instead, AV/C controller 450 queries the target devices and reads information from the target devices that is provided in response to the query. Specifically, each target device has connection state variables identifying the connectable input and output plugs that are present on the device. In the present embodiment, for TV 430, the possible state variables are V1, V2, and serial bus input plug 410. For VCR 440, the possible state variables are V3, V4, and serial bus output plug 420. It is appreciated that a greater number of state variables can be used, and that different names (including user-friendly names) may be used.

In summary, AV/C controller 450 queries the state variables to identify the connectable input and output plugs, and displays this information to the user. Using a round-robin approach, AV/C controller 450 scrolls through possible connections. The functionality of input-select button 451 is expanded so that when a user uses that button, AV/C controller 450 initiates a query of target devices to identify devices that can be selected as a source device. An output-select button is added to AV/C controller 450 so that when a user uses that button, AV/C controller 450 initiates a query to identify which output plug to use on a source device. The target devices describe themselves to AV/C controller 450, and the controller uses this information to display possible choices to the user. The user can then make an input selection and an output selection as described above.

Accordingly, AV/C controller does not need to process and store substantial amounts of information regarding the many possible connections. Thus, AV/C controller 450 can be designed with, for example, fewer logic gates, a less powerful processor, and smaller memory capacity. In addition, the amount of information that needs to be transported over network bus 230 is reduced, and network bandwidth is not consumed by transporting this information. Furthermore, the likelihood of an error in the connection information is reduced because a lesser amount of information is needed, and because there is a direct interaction with the target device instead of with information stored previously for the target device. Thus, a user can select a particular target device with confidence that a connection to the device will be made.

In the present embodiment, there are two primary approaches a user can implement to select and control the devices on the home network: an interactive approach, and a remote approach. In the interactive approach, the devices to be connected are within sight of the user (e.g., in the same room). Thus, in the interactive approach, there may not be a need to query the state variables because the user can see the devices to be connected to and to be controlled. In the remote approach, the devices to be connected are generally not within sight of the user, and so the state variables are queried so that the possible selections can be made known to the user.

In addition, network bus 230 can also be coupled to the Internet through a gateway (not shown), so that a user can select and control devices from a remote location via the Internet.

In another embodiment, instead of an approach in which the user inputs selections manually, an automatic approach can be implemented. For example, a user can program selections in advance (e.g., particular devices are to be selected at a certain day and time), and AV/C controller 450 can execute the programmed selections automatically. Also, AV/C controller 450 can be programmed to remember and store (record) a user's selections as they are made. AV/C controller 450 can then automatically execute these stored selections at, for example, the same time the next week.

In addition to scrolling through available (connectable) AV/C units and subunits (e.g., using a round-robin approach), AV/C controller 450 can also be used to scroll through active channels on network bus 230. For example, if two VCRs are included in the home network and both are running movies, a user at a TV can scroll between the active channels associated with each movie and select the channel showing the movie of interest.

Because the user can select the output plug to be used by a source device such as VCR 430, it is not necessary for the output to be provided to each of the possible output plugs. For example, if a user selects V3 (analog) as the output plug to be used, it is not necessary to stream the output to serial bus output plug 420 (digital) and onto network bus 230. In this case, in accordance with the present invention, the bandwidth available on network bus 230 is not consumed unnecessarily, thus increasing the amount of bandwidth for active connections between other devices on the network. In one embodiment, the output is still provided to each of the analog output plugs (e.g., V3 and V4), but is only provided to serial bus output plug 420 when that plug is selected by the user.

Figure 4B:
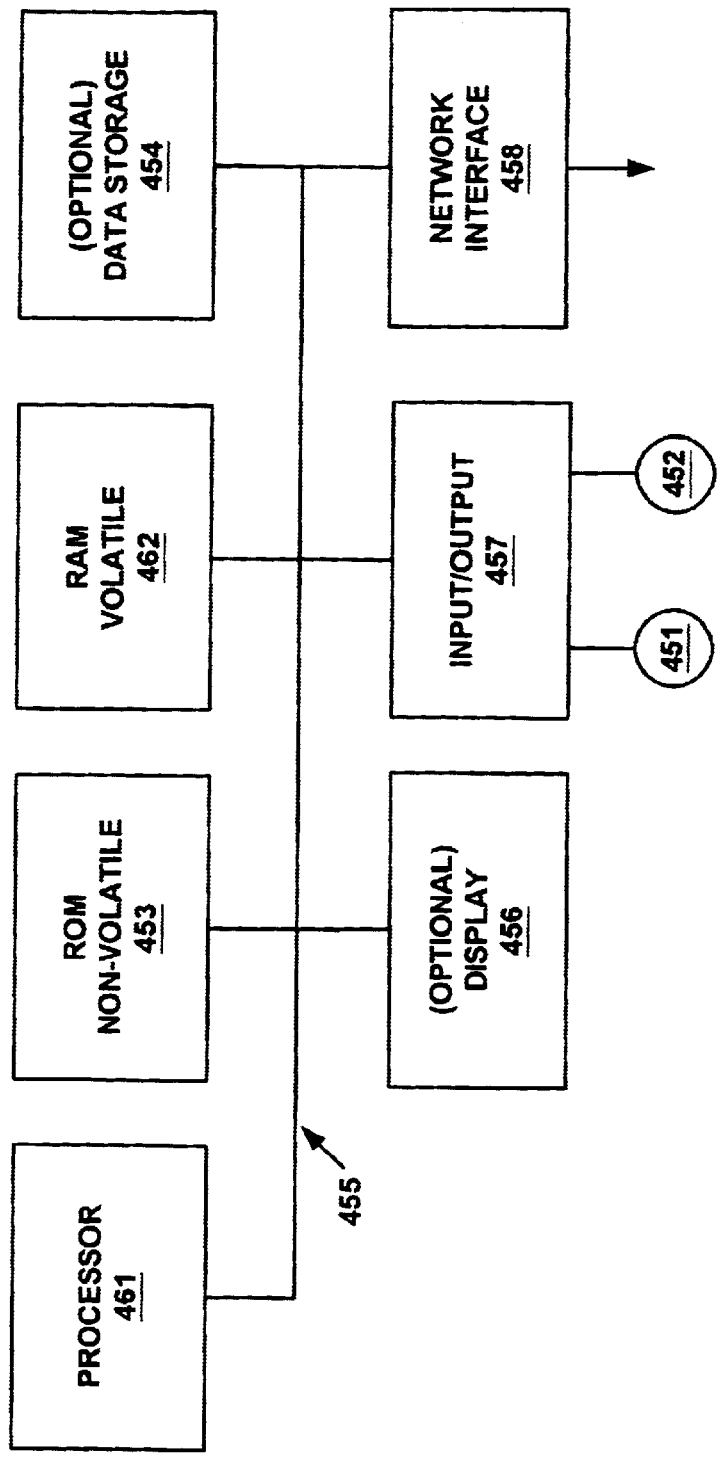
FIG. 4B is a block diagram of a controller device in accordance with one embodiment of the present invention.

FIG. 4B is a block diagram of one embodiment of AV/C controller 450 in accordance with the present invention. In general, AV/C controller 450 comprises bus 455 for communicating information, processor 461 coupled with bus 455 for processing information and instructions, random access memory (RAM volatile) 462 coupled with bus 455 for storing information and instructions for processor 461, read-only memory (ROM non-volatile) 453 coupled with bus 455 for storing static information and instructions for processor 461, and optional data storage device 454 such as a magnetic or optical disk. Network interface 458 is for coupling AV/C controller 450 to network bus 230 (FIG. 4A) and may be an infrared or other wireless (e.g., radio frequency) device. Input/output device 457 provides the interface between input-select button 451, output-select button 452 and bus 455. AV/C controller 455 may also include an optional display 456 for communicating information to a user.

Figure 5:
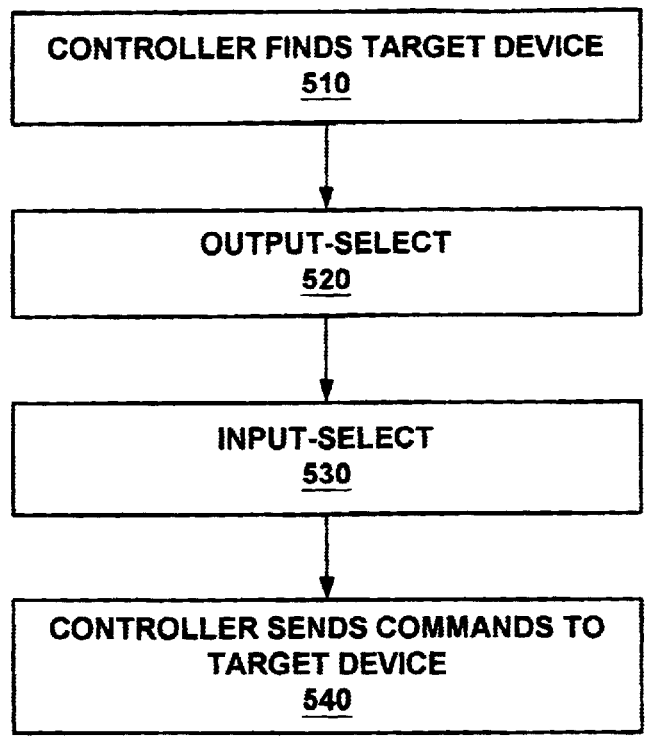
FIG. 5 is a flowchart of the steps in a process for connecting with and controlling devices in accordance with one embodiment of the present invention.

FIG. 5 is a flowchart of the steps in a process 500 for selecting and controlling devices in a home network in accordance with one embodiment of the present invention. Process 500 is implemented using AV/C controller 450 of FIG. 4A. Although specific steps are disclosed in process 500 of FIG. 5, such steps are exemplary. That is, the present invention is well suited to performing various other steps or variations of the steps recited in process 500. It is appreciated that the steps in process 500 may be performed in an order different than presented, and that not all of the steps in process 500 may be performed.

In step 510 of FIG. 5, AV/C controller 450 finds various target devices (sinks and sources). That is, AV/C controller 450 finds the device's node identifier or other such address information. In the present embodiment, AV/C controller 450 scrolls through possible connections using a round-robin approach. That is, for example, a first possible connection is identified, and then in response to input from the user, the next possible connection is identified.

In step 520 of FIG. 5, with reference also to FIG. 4A, for a selected source device such as VCR 440, output-select button 452 is used to select a particular output plug. For example, for a connection over network bus 230, serial bus output plug 420 is selected. Bandwidth for the connection is allocated and an isochronous channel number is assigned. Typically, the bandwidth and channel number are provided by the Isochronous Resource Manager (IRM) in an IEEE 1394 AV/C network. The channel number is stored as a state variable so that it can be queried by sink devices (e.g., TV 430) that want to receive the output.

In step 530 of FIG. 5, with reference still to FIG. 4A as well, for a selected sink device such as TV 430, input-select button 451 is used to select a particular input device (source device) such as VCR 440 and a particular input plug.

In step 540 of FIG. 5, AV/C controller 450 can be used to send commands (e.g., volume change, play, record, etc.) to the target devices on the network.

From a user's point of view, AV/C controller 450 functions somewhat like an analog remote control, and as such will be familiar to users and thus user-friendly. However, AV/C controller 450 is a digital controller and thus is significantly different from an analog controller. In addition, AV/C controller 450 has much greater capabilities than an analog controller. AV/C controller provides the capability to function within a digital home network, allowing a user to set up connections between various devices on the network and to control those devices. The input-select button is provided with additional functionality that causes a query to be performed of state variables on a selected target device. An output-select button is added that provides the functionality to cause a query to be performed of state variables on a selected target device.

The preferred embodiments of the present invention, method and system for selecting and controlling devices in a home network, are thus described. While the present invention has been described in particular embodiments, it should be appreciated that the present invention should not be construed as limited by such embodiments, but rather construed according to the following claims.

What is claimed is:

1. In a controller device, a method for establishing a connection between devices in a network, said method comprising:

identifying a first device selected from a first listing of devices, wherein said first device is a sink device for receiving input from another device;

selecting an input plug for said first device from a listing of input plugs for said first device, said listing of input plugs derived from state information read from said first device and not written to memory in said controller device;

identifying a second device selected from a second listing of devices, wherein said second device is a source device for providing input to another device;

selecting an output plug for said second device from a listing of output plugs for said second device, said listing of output plugs derived from state information read from said second device and not written to memory in said controller device; and establishing a connection between said first device and said second device using said input plug and said output plug.

2. The method of claim 1 wherein said network is substantially compliant with the IEEE 1394 communication bus standard.

3. The method of claim 1 wherein said first listing and said second listing are the same.

4. The method of claim 1 wherein said first listing comprises sink devices and said second listing comprises source devices.

5. The method of claim 1 wherein input provided to said first device is output by said second device using only said output plug.

6. The method of claim 1 comprising:

querying said first device and said second device; and reading information provided in response to said querying, wherein said information is used for generating said listing of input plugs and said listing of output plugs.

7. The method of claim 1 comprising:

executing programmed instructions to automatically select said first device, said input plug, said second device and said output plug.

8. The method of claim 1 comprising:

recording selections of said first device, said input plug, said second device and said output plug.

9. The method of claim 1 comprising:

selecting a channel from a listing of active channels, wherein said listing of active channels identifies network connections between devices in said network.

10. A controller device for establishing a connection between devices in a network, said controller device comprising:

a user interface comprising an input-select element and an output-select element;

wherein said input-select element is operable to cause a first device to be selected from a first listing of devices and to cause an input plug for said first device to be selected from a listing of input plugs for said first device, wherein said first device is a sink device for receiving input from another device and wherein said listing of input plugs is derived from state information read from said first device but not written to memory in said controller device;

wherein said output-select element is operable to cause a second device to be selected from a second listing of devices and to cause an output plug for said second device to be selected from a listing of output plugs for said second device, wherein said second device is a source device for providing input to another device and wherein said listing of output plugs is derived from state information read from said second device but not written to memory in said controller device; and wherein in response to selection of said input plug and selection of said output plug a connection is made between said first device and said second device via said input plug and said output plug.

11. The controller device of claim 10 wherein said network is substantially compliant with the IEEE 1394 communication bus standard.

12. The controller device of claim 10 wherein said first listing and said second listing are the same.

13. The controller device of claim 10 wherein said first listing comprises sink devices and said second listing comprises source devices.

14. The controller device of claim 10 wherein input provided to said first device is output by said second device using only said output plug.

15. The controller device of claim 10 wherein a selection of said first device, said input plug, said second device and said output plug is performed automatically according to programmed instructions.

16. The controller device of claim 10 wherein said controller device is operable to record selection of said first device, said input plug, said second device and said output plug.

17. The controller device of claim 10 wherein said input-select element is operable to cause a channel to be selected from a listing of active channels, wherein said listing of active channels identifies network connections between devices in said network.

18. A controller device for establishing a connection between devices in a network, said controller device comprising:

means for identifying a first device selected from a first listing of devices, wherein said first device is a sink device for receiving input from another device;

means for selecting an input plug for said first device from a listing of input plugs for said first device, said listing of input plugs derived from state information read from said first device and not written to memory in said controller device;

means for identifying a second device selected from a second listing of devices, wherein said second device is a source device for providing input to another device;

means for selecting an output plug for said second device from a listing of output plugs for said second device, said listing of output plugs derived from state information read from said second device and not written to memory in said controller device; and means for establishing a connection between said first device and said second device using said input plug and said output plug.

19. The controller device of claim 18 wherein said network is substantially compliant with the IEEE 1394 communication bus standard.

20. The controller device of claim 18 wherein input provided to said first device is output by said second device using only said output plug.

21. The controller device of claim 18 comprising:

means for querying said first device and said second device; and means for reading information provided in response to said querying, wherein said information is used for generating said listing of input plugs and said listing of output plugs.

22. The controller device of claim 18 comprising:

means for executing programmed instructions to automatically select said first device, said input plug, said second device and said output plug.

23. The controller device of claim 18 comprising:

means for recording selections of said first device, said input plug, said second device and said output plug.

24. The controller device of claim 18 comprising:

means for selecting a channel from a listing of active channels, wherein said listing of active channels identifies network connections between devices in said network.

* * * * *